United States Patent [19]
Scharpf

[11] Patent Number: 5,509,715
[45] Date of Patent: Apr. 23, 1996

[54] PROTECTED FLOORING

[76] Inventor: Mike A. Scharpf, 1450 N. Clay Rd., Oshkosh, Wis. 54904

[21] Appl. No.: 422,987

[22] Filed: Apr. 17, 1995

[51] Int. Cl.⁶ ..................................................... B60J 5/06
[52] U.S. Cl. ............................ 296/181; 105/422; 52/408
[58] Field of Search ................................ 296/181, 182, 296/39.1; 105/375, 422; 52/408; 220/460, 461, 462, 463

[56] References Cited

U.S. PATENT DOCUMENTS

| | | | |
|---|---|---|---|
| 1,922,027 | 8/1933 | Carter | 296/181 |
| 3,692,349 | 9/1972 | Ehrlich | 296/181 |
| 4,015,876 | 4/1977 | Hulverson et al. | 296/181 |
| 4,526,418 | 7/1985 | Martin | 296/182 |
| 4,671,562 | 6/1987 | Broadbent | 296/181 |
| 4,910,936 | 3/1990 | Abendroth et al. | 52/408 X |

*Primary Examiner*—Joseph D. Pape
*Attorney, Agent, or Firm*—R. Jonathan Peters

[57] ABSTRACT

The invention provides a barrier means for a wooden flooring, especially useful for truck trailers and shipping containers. The flooring for such structures is comprised of a plurality of substantially parallel, wooden strips having their longitudinal edges in abutting relationship. A barrier film or fabric, which is permeable to vapor and impermeable to liquid, is disposed on the undersurface of the flooring, and discontinuous means adjoins or bonds the film or fabric to the flooring at least at the perimeter of the flooring.

11 Claims, 1 Drawing Sheet

PROTECTED FLOORING

FIELD OF INVENTION

This invention relates to protected flooring especially useful for truck trailers, railroad box cars, and shipping containers. In its more specific aspect, this invention relates to protected flooring, especially useful for truck trailers, railroad box cars, and shipping containers, having a barrier means permeable to vapor.

BACKGROUND AND PRIOR ART

Wood flooring is used extensively for truck trailers, railroad box cars, and shipping containers sometimes known as cargo containers. The flooring for semi-trailers, railroad box cars, and shipping containers consists of lengths of wooden strips, typically measuring about 1 inch in width and 1 and ¼ inch in depth. The wooden strips are joined endwise to the desired length (for a truck trailer, typically about 40 feet or more), and the formed strips are laid longitudinally side by side, that is in edge-to-edge abutment, and sealed at the seams to form a one foot wide flooring plank. The flooring planks are then joined along the longitudinal edges, usually by tongue-and-groove, to form a floor, which for a truck trailer is about eight feet or more in width.

In a wood flooring of this construction, the seams have a tendency to separate, and water from beneath the flooring can enter the interior of the trailer, box car, or shipping container through the splits, joints, or openings, which can damage the goods being transported or shipped. Separation at the seams of the wood strips or planks is aggravated by reason of normal use, such as occurs when loading or unloading or from jarring during transportation. Further, water on the interior of the truck trailer, box car, or shipping container can warp the wood flooring causing even greater separation of the wood strips or planks. In order to inhibit water from entering the interior, the underside of the flooring is spray coated with various organic sealants, which now has been discontinued due to environmental problems. The industry now uses a water-base acrylic sealant. It is important, however, that the wood be allowed to breathe, and that vapor be transmitted though the wood flooring. The problem with the acrylic sealants is these materials are impervious to vapor. In the event water is carried unintentionally into the interior, such as snow carried along with the goods being shipped or when loading during a rainstorm, this water can seep into the flooring and cannot pass through the flooring even as vapor because of the impervious barrier. Also, the acrylic, when first applied, frequently does not fill all of the cracks or openings in the floor, or the wood can expand and contract thereby forming an opening and allowing water to enter the trailer. Additionally, the acrylic is brittle and tends to crack, thereby forming an opening which allows for the entrance of water.

There are a number of patents relating to film insulating and barrier materials, including insulating materials for vehicle panels and flooring. U.S. Pat. No. 3,788,682 discloses a trailer construction having side panels 12 comprising a core 13 of plywood or the like, and a coating of plastic-containing material on the opposite surfaces. The coating is described as a fiber reinforced resin, such as a polyester of polyether resin reinforced with glass fibers, which is bonded to the core by heat curing and pressure. The object of the invention is to provide a body panel in which the entrapment of air between the plastic coating and the core is eliminated.

A floor construction is disclosed in U.S. Pat. No. 2,149,026 comprising a concrete sub-floor, a mastic coating 7 conforming to the surface of the concrete, and a wooden flooring 2. The mastic pad is described as oleaginous (oily material), and specifically as asphalt, asphaltic base composition, or as an asphalt cement. This construction protects the flooring from adverse moisture conditions, both from within the room and from moisture migrating from the concrete sub-floor.

Waterproofing paper, fabric or other materials used in conjunction with lumber construction are disclosed in U.S. Pat. Nos. 1,655,699; 2,070,479; 2,712,863; and 4,146,662. Thus, U.S. Pat. No. 1,655,699 discloses a composite lumber slab comprising two layers of wooden blocks A and B interposed with a layer of fabric C saturated with glue. In U.S. Pat. No. 4,146,662, there is disclosed a solid core door having a hardwood veneer 16 coated on each side with a resin impregnated overlay 14. In U.S. Pat. No. 2,070,479, a layer of felt 24 is cemented to the flooring 25 to provide sound and heat proofing, and the wall panels 40 are provided with a layer of waterproof paper 39. The prefabricated bathroom unit disclosed in U.S. Pat. No. 2,712,863 includes a floor 50 covered on the upper surface with a waterproof material 54, such as aluminum, overlayed with a sheet of linoleum 56.

No reference is known to the inventor disclosing or relating to a useful and practicalable protected wood flooring for a truck trailer, railroad box car, or shipping container. This invention has, therefore, as its purpose to provide a wood flooring that is isolated or protected from the ingress of liquid from the undersurface.

Another object of the invention is to provide a barrier means for such flooring that is impermeable to liquid and permeable to vapor.

It is still another object of this invention to provide such a barrier means that is breathable so as to prevent water from entering the interior surface of the flooring but allowing vapor to pass, thereby substantially eliminating warpage of the flooring caused by water entering and accumulating on the interior side of the flooring.

Yet another object of the invention is to provide such a barrier means that will allow for water situated or confined interiorly to egress as vapor.

It is still another object of this invention to provide such a barrier means that is breathable so as to prevent water from entering the interior surface of the flooring but allowing vapor to pass, thereby substantially eliminating damage to the goods being shipped caused by water on the interior side of the flooring.

SUMMARY OF THE INVENTION

Broadly, the invention provides for a liquid barrier means for flooring, especially useful for truck trailers, railroad box cars, and shipping containers, formed of wooden strips and planks. The term "flooring" as used herein and in the appended claims includes both the individual planks and a complete floor composed of several planks as the lower surface or platform of the structure. The barrier means comprises a continuous breathable layer of film or fabric adjoined or attached in a discontinuous pattern to the undersurface of the flooring, as explained hereinbelow in greater detail. In this manner, the floor is made water-tight where there are butt joints or where a separation occurs at a glued joint or seam in the flooring. It is important for my invention that the plastic film or fabric, such as a spunbonded polymer (e.g., polyethylene or polypropylene), is impervious to moisture but pervious to vapor. Film and fabric materials of this nature are referred to as "breathable." The term "breathable" as used herein and in the appended claims means a film or fabric that is impermeable to liquid and permeable to vapor, and these materials are well known and are commercially available.

Thus, the wood flooring is protected, and any liquid, such as water, is prevented from entering the trailer, railroad box car or shipping container, or water interiorily disposed when vaporized will pass through the barrier, because the fabric or plastic is allowed to breathe and thereby prevents warping or splitting of the wood. Also, when a continuous layer of a film or fabric is applied to the entire undersurface of the flooring, any cracks or crevices in the flooring are covered by the film. The film is adjoined or attached to the undersurface of the flooring with or by a discontinuous means or discontinuous bond line, thereby forming a discontinuous pattern of connection between the two members (i.e., barrier and flooring), but it is essential that the barrier is adjoined at least at the periphery of the flooring. The terms "discontinuous means" and "discontinuous bond line" as used herein and in the appended claims mean the line of adjoining, attaching or uniting the two components (i.e., barrier and flooring) so as to be essentially adjacent, and as a discontinuous pattern in that less than the entire surface or area of the film or fabric is adjoined to the flooring. In accordance with one embodiment of my invention, a nonwater-base adhesive is applied as a discontinuous pattern to one surface of the film or fabric, or to the undersurface of the flooring, and the film or fabric is then bonded or sealed to the undersurface of the flooring. Adhesives for this purpose (not water soluble) are well known, and include, for example, a thermoplastic or a thermosetting adhesive. The adhesive is applied at least at the perimeter of one or the other of the surfaces, i.e., the perimeter of the barrier layer or of the flooring. Where desired, the adhesive pattern comprises a plurality of horizontal and vertical stripes or rows thereby forming a rectangular pattern, so that in the event the film or fabric is torn or damaged, any exposure to the flooring is confined to a small area defined by the rectangle. In an alternative embodiment of the invention, the fabric or film is stretched over the flooring and then attached at the perimeter, as by stapling, and, if desired, at other positions within the area of the film or fabric, including stapling in vertical and horizontal rows.

DETAILED DESCRIPTION OF THE INVENTION

Figure 1:
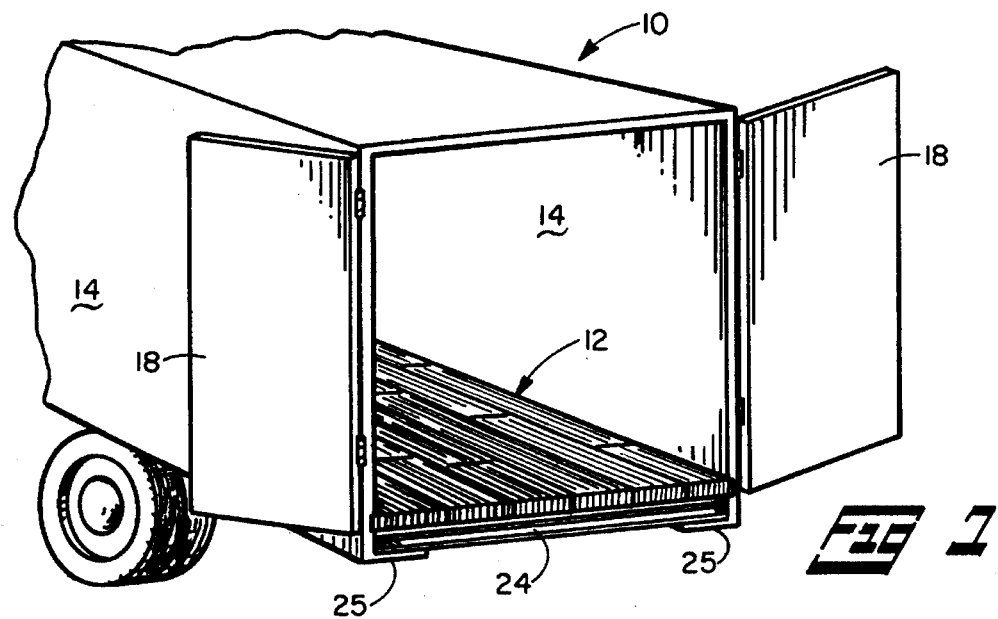
FIG. 1 is a perspective view of truck trailer partly in cross-section depicting the construction of a wood flooring for a trailer body and utilizing the present invention.

Referring to the drawings, wherein like reference numerals refer to similar parts throughout the several views, there is shown in FIG. 1 a truck trailer or trailer body, indicated generally by the numeral 10. The invention is described herein below with particular reference to a truck trailer, but it should be understood that the invention is also applicable to a box car or shipping container having a wood flooring. The truck trailer 10 has a wood flooring 12, described below in detail, and side walls 14 and roof 16 of any suitable material typically sheet metal. Further, the trailer body is enclosed at the rear end with doors 18. The dimensions of the trailer body and the construction of the side walls, roof and doors form no part of the present invention, per se, other than providing a general description or construction of the trailer body. It will be observed that the trailer body is essentially enclosed.

Figure 2:
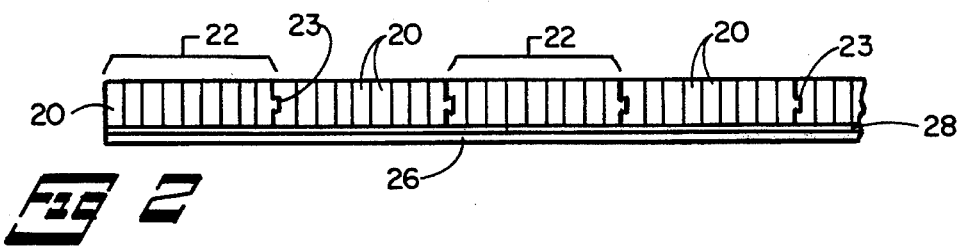
FIG. 2 is a fragmentary elevational view of the flooring of FIG. 1, with the dimensions being exaggerated for clarity, showing in greater detail the present invention.

As shown in FIGS. 1 and 2, the wood flooring 12 is comprised of a plurality of planks formed by laying in edge-to-edge abutment a plurality of wooden strips 20. The wooden strips typically measure 1 inch in width and 1 and ¼ inch in depth, and are of varying length. The strips are joined endwise to form the desired length for the truck trailer, and layed edge-to-edge to form a plank 22. A floor construction for a typical truck trailer would use one foot wide planks, each plank measuring about 40 feet, but these dimensions can vary widely. The planks are joined at the longitudinal edges such as by tongue and groove 23, as shown in FIG. 2. A plurality of I-beams 24, supported by an extension of the side walls 14 and having a transverse flange 25 (or other suitable support means, which can vary among trailer manufacturers) are disposed transverse to the flooring and support the flooring in place.

During normal use of the trailer, the seams between the wooden strips and/or planks become separated or split. As a consequence, water from beneath the floor can enter or seep into the interior of the trailer body through the splits or openings. For example, it is not uncommon for water from the road to be splashed against the undersurface of the flooring, or, in the case of a container, to be sitting in a puddle of water. Any split or opening in the flooring provides relatively easy ingress for the water. Obviously, water in the interior of the trailer body, or container, can cause warpage of the wood slits or planks, thereby resulting in larger openings. Still further, the water can damage the goods being shipped, or can damage the shipping cartons (e.g., paperboard cartons) for the goods.

In accordance with my invention, I provide a barrier means or layer 26 on the undersurface of the wooden flooring. The barrier means comprises a continuous film or fabric which is impervious to moisture but pervious to vapor. Materials of this type are known as "breathable" and are readily available as commercial products. These materials, which is not my invention, per se, include, for example, nonwovens, and expanded porous polytetrafluoroethylene. Further, the barrier layer may comprise a single layer, and be of a single or homogeneous composition, or may be a composite or laminate of two or more layers, or of two or more materials of the same or different composition. Nonwovens that can be employed in my invention comprise a conglomeration or matte of fibers or filaments, which may be wet laid, dry laid, or spunbonded, and the fibers or filaments are bonded inherently, mechanically, thermally, or chemically. Such nonwovens include, for example, polyolefins such as polyethylene or polypropylene, polyester, rayon, and nylon. Commercially known materials useful as a barrier layer are TYVEK, a registered trademark by DuPont & Co., comprising meltblown high density polyethylen; GORE-TEX, a registered trademark of Gore-Tex, Inc., comprising TEFLON laminated to a woven fabric; and PINK- WARP, a trademark of Owens Corning Fiberglas Corp., comprising woven polypropylene.

Figure 3:
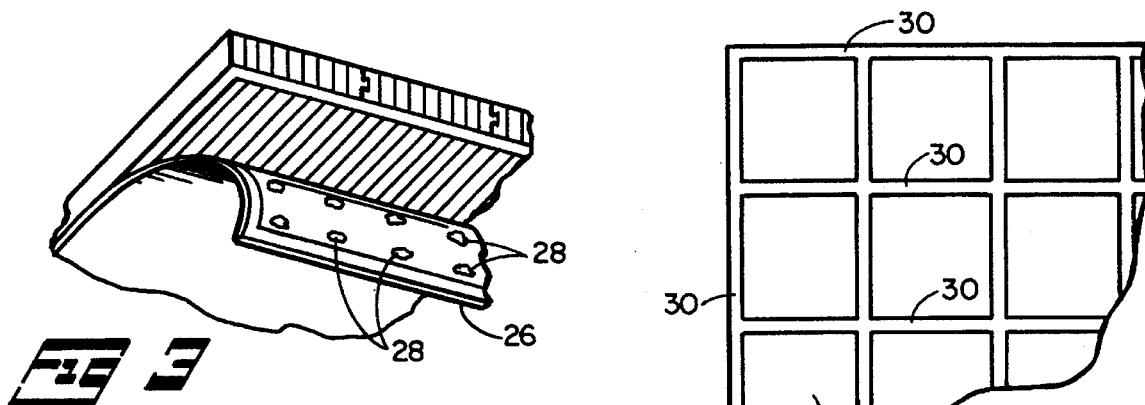
FIG. 3 is a fragmentary perspective view of the flooring of FIG. 1 showing the barrier means partially lifted to better illustrate the structure and to show an adhesive pattern as applied to the barrier.
Figure 4:
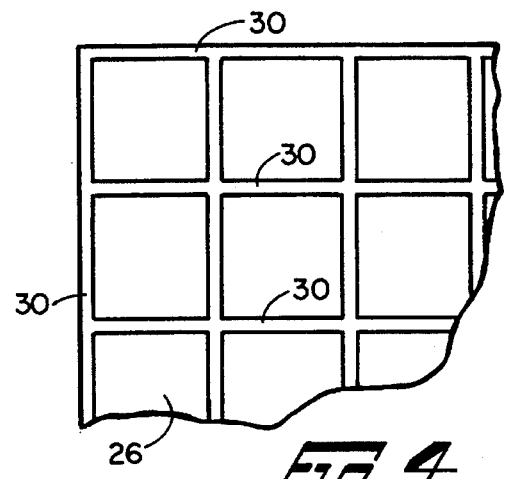
FIG. 4 is a fragmentary plan view of the barrier layer such as used in the construction shown FIG. 1 showing an alternative embodiment of the invention.

The barrier layer of film or fabric is provided with a discontinuous bond line, that is, the line or pattern which attaches the two adherends, as defined above. For example, a discontinuous glue line or adhesive layer, such as of a hot melt or a pressure sensitive adhesive, will adjoin or bond the barrier in a discontinous pattern to the undersurface of the plank or flooring. It should understood that the floor is comprised of several planks, and it may be desirable to adjoin or bond the barrier material to each plank, which is then arranged into a floor as the lowersurface or platform of a truck trailer, box car or shipping container, or it may be desirable to apply the barrier material over the entire area of a finished floor. If each plank of the floor is covered with the barrier layer, it is easier to replace a damaged barrier layer for a plank only, rather than replacing a barrier layer for the entire floor. It is essential, however, that the barrier is adjoined or bonded at least at the periphery of the plank or flooring. Thus, as shown in FIGS. 3 or 4, an adhesive 28 (described below in detail) is applied at the longitudinal and transverse borders of the barrier material, and when the barrier is bonded to the plank or flooring, adhesion of the barrier will be coterminus with the periphery of the plank or floor. When a continuous film or fabric is applied to the entire undersurface of the flooring, any cracks or crevices in the flooring are covered by the barrier film or fabric. In this manner, the floor is made water-tight where there are butt joints or where a separation occurs at a glued joint or seam in the flooring. Any liquid, such as water, is inhibited from entering the trailer, but the wood is allowed to breathe and thereby prevent warping. Also, because water cannot enter the trailer, the goods being shipped, or the cartons holding the goods, are protected from becoming wet. Where desired, the barrier material can be stapled to the flooring, or a combination of adhesive and stapling can be used in adjoining the two components. Also, the flooring is typically bolted or riveted to the I-beams, and this connection complements the connection or bond between the two.

As stated above, adjoining of the barrier layer to the undersurface of the plank or flooring is not uniform but rather discontinuous, because uniform bonding would substantially diminish or eliminate the permeability of the barrier to vapor. Although it should be understood that adjoining can be achieved by mechanical means such as stapling, it is preferable to use a discontinuous bond line or layer of an adhesive, which is applied at the borders of the film or fabric and also may be applied as a pattern throughout the body of the film or fabric material. As shown in FIG. 3, the adhesive 28 is applied at the borders or periphery of the barrier, and also as a discontinuous pattern or bond line elsewhere throughout the layer member. There is shown in FIG. 4 a preferred embodiment where the adhesive layer is applied in a plurality of horizontal and vertical stripes 30 as rows and columns. This pattern of rows and columns is particularly desirable because in the event of any damage to the barrier layer of film or fabric over a relatively small area, any exposure of the flooring is confined to a small area defined by a rectangle. This preferred feature substantially minimizes the chances of water entering the trailer body interior through a small area. Also, it can simplify repair to the damaged area.

Where desired, an anchor coating or primer surface may be applied to or formed on the facing of the plastic or fabric material in order to enhance the bonding of the adhesive to the plastic film or fabric barrier. One method of enhancing the surface of the barrier is to apply a size such as an adhesive or resin. Size compositions for this purpose are known in the art and are available, and the particular size used will depend on such factors as the method of application, the composition of the barrier, and the composition of the adhesive, and can be determined by one having skill in the art. The anchor coating typically is applied to the plastic film or fabric in a liquid state as by silk screening, or by roll coating, or by a tower coater, and is applied to a thickness of about 0.5 to 1.5 mils. Further, the coating may be applied over the entire surface of the barrier so as to be coextensive therewith, or may be applied as a pattern coinciding with the selected pattern of the adhesive to be applied subsequently to the primer or coating. The coating is allowed to dry, and typically to the touch appears to have essentially no tack.

As an alternative to a primer or size, the surface of the barrier film or fabric may be primed or activated by corona discharge, ultraviolet irradiation, plasma treatment, flame treatment, or the like, which surface activation treatments are well known in the art. Preferably, surface treatment is achieved by high-voltage electrostatic corona discharge by passing the paper substrate over ceramic electrodes operated at frequencies ranging from about 10 KHZ to 35 KHZ at voltages ranging from about 6,000 to 10,000 volts.

The barrier film or fabric, which may have the primed or activated surface, is coated with a suitable adhesive 26, such as a hot melt adhesive or a pressure-sensitive adhesive, and as a discontinuous bond line described above. The adhesive coating is applied as a discontinuous coating by any conventional means such as silk screening, roll coating, tower coating, or the like, and at a thickness of about 0.5 to 1.5 mil. The adhesive is applied at least at the periphery of the barrier so when disposed on the undersurface of the plank or flooring, the adhesive border is substantially coterminus with the periphery of the flooring. Suitable adhesives include, for example, thermoplastic adhesives, thermosetting plastics adhesives, and pressure-sensitive adhesives, but the particular adhesive selected will depend on such factors as the type or composition of the barrier, the use of any surface treatment, and the most economical method of application chosen by the operator, and can be determined by one having skill in the art. Thermoplastic and thermosetting plastic adhesive include, for example, ethylene vinyl acetate, polyacrylates, latex, polyvinyl alcohol, epoxy resins, and the like. Pressure sensitive adhesives usuful for my invention typically comprise an admixture of an elastomer and a tackifier, and also may include other constituents such as a plasticizer, antioxidant, etc. Suitable elastomers used, for example, are natural or synthetic rubber, polyacrylates and acrylate esters, polyisobutylene, and block copolymers, and commonly used tackifying agents include gum rosin, rosin esters, polyterpene resins, oil-soluble phenolic resins, and petroleum hydrocarbon resins. These suitable adhesives, such as pressure sensitive adhesives and hot melt adhesevies, are well known and are commerically available, and the best adhesive can be readily determined by one having the appropriate skill in the art. It is desirable to provide a quick release member or release liner (not shown) over the adhesive coating to protect the coating from dust and debris until ready for application to a plank or flooring, and to prevent blocking. The quick release member is removed from the barrier by the operator at the time the barrier is to be applied to the plank or flooring.

Figure 5:
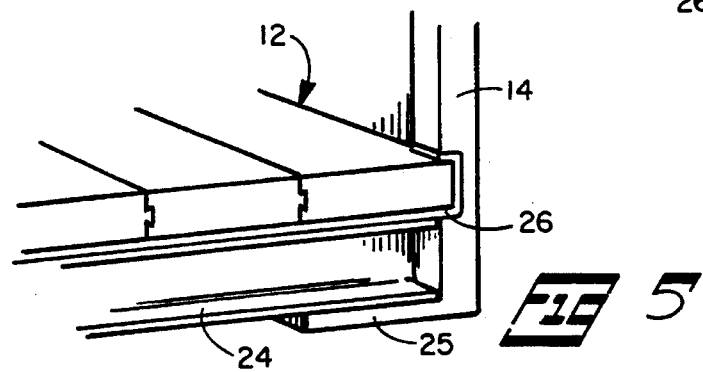
FIG. 5 is an fragmentary end view, partly in section, or a truck trailer showing an alternative embodiment of the invention.

There is shown in FIG. 5 another embodiment of my invention where the barrier layer is applied or stretched over the entire undersurface of the flooring and upwardly along the sides of the flooring. Thus, the wall 14 of the truck has a suitable recess to accommodate or receive the longitudinal edge portion of the flooring as a further support means. The barrier layer 26 is extended over the sides of the flooring, and where desired can be brought into overlapping relation with the top marginal edge of the flooring, as shown in FIG. 5. The barrier layer is then adjoined to the flooring, as by stapling or by an adhesive, substantially as described above. Also, the recess in the side walls may be designed or constructed so as to provide a sufficiently tight fit for the barrier layer, which when coupled with the bolting of the I-beams to the floor, there is adequate adjoining of the barrier to the flooring, thereby obviating the need for adjoining or bonding as with an adhesive or by stapling.

It thus will be observed that by reason of my invention, I provide a flooring for a truck body, railroad box car, or shipping container that is protected from the ingress of water, and permits the egress of water as vapor from the interior thereof. This protection not only protects the wood flooring from warping and splitting, but protects the contents being shipped as well.

It should be recognized that the present invention utilizes available film and fabric materials and adhesive materials, and comparable materials may be substituted for the specific items identified herein. Therefore, specific details disclosed above are not to be interpreted as limiting, but merely as a basis of the claims and for teaching one skilled in the art to practice the present invention in any appropriately detailed manner. Changes may be made in the details of construction of the invention without departing from the spirit of the invention, especially as defined in the following claims.

I claim:

1. A flooring having a top surface and an undersurface, for truck trailers, railroad box cars, or shipping containers, comprising: a plurality of substantially parallel, wooden strips having their longitudinal edges in abutting relationship; a plastic film or fabric disposed to the undersurface of said flooring, said plastic film or fabric being permeable to vapor and impermeable to liquid; and discontinuous means for adjoining said plastic film or fabric to said undersurface of said flooring at least at the perimeter of said flooring.

2. A flooring according to claim 1 wherein said plastic film or fabric is adjoined to said undersurface in a pattern comprising horizontal rows and vertical columns.

3. A flooring according to claim 1 or claim 2 wherein said plastic film or fabric comprises a nowoven polyolefin.

4. A flooring according to claim 1 or claim 2 wherein said plastic film or fabric is adjoined to said undersurface by stapling.

5. A flooring according to claim 1 or claim 2 wherein said plastic film or fabric is adjoined to said undersurface by an adhesive.

6. A flooring according to claim 1 or claim 2 wherein said adjoining of said plastic film or fabric to said flooring comprises a discontinuous bond line of a thermosetting adhesive.

7. A flooring according to claim 1 or claim 2 wherein said adjoining of said plastic film or fabric to said flooring comprises a discontinuous bond line of a thermoplastic adhesive.

8. A flooring according to claim 1 or claim 2 wherein said adjoining of said plastic film or fabric to said flooring comprises a discontinuous bond line of a pressure sensitive adhesive.

9. A flooring according to claim 1 or claim 2 wherein said said plastic film or fabric is adjoined to said undersurface by adhesive and by stapling.

10. A flooring according to claim 1 or claim 2 wherein said plastic film or fabric comprises a nowoven polyolefin and is adjoined to said undersurface by stapling.

11. A flooring according to claim 1 or claim 2 wherein said plastic film or fabric comprises a nowoven polyolefin and is adjoined to said undersurface by an adhesive.

\* \* \* \* \*